(12) United States Patent
Kim

(10) Patent No.: US 7,457,880 B1
(45) Date of Patent: Nov. 25, 2008

(54) SYSTEM USING A SINGLE HOST TO RECEIVE AND REDIRECT ALL FILE ACCESS COMMANDS FOR SHARED DATA STORAGE DEVICE FROM OTHER HOSTS ON A NETWORK

(75) Inventor: Han-gyoo Kim, Irvine, CA (US)

(73) Assignee: Ximeta Technology, Inc. (VG)

( * ) Notice: Subject to any disclaimer, the term of this patent is extended or adjusted under 35 U.S.C. 154(b) by 200 days.

(21) Appl. No.: 10/951,474

(22) Filed: Sep. 27, 2004

Related U.S. Application Data

(60) Provisional application No. 60/590,722, filed on Jul. 22, 2004, provisional application No. 60/581,691, filed on Jun. 21, 2004, provisional application No. 60/506,829, filed on Sep. 26, 2003.

(51) Int. Cl.
  *G06F 15/16* (2006.01)
(52) U.S. Cl. .................. 709/229; 709/216; 709/225
(58) Field of Classification Search ............. 709/225, 709/229, 224, 216; 707/3, 8, 100; 726/16; 718/104, 100; 710/200
  See application file for complete search history.

(56) References Cited

U.S. PATENT DOCUMENTS

| 5,329,619 | A |   | 7/1994  | Page et al. |
| 5,426,427 | A |   | 6/1995  | Chinnock et al. |
| 5,463,772 | A |   | 10/1995 | Thompson et al. |
| 5,513,314 | A |   | 4/1996  | Kandasamy et al. |
| 5,524,247 | A | * | 6/1996  | Mizuno .......... 710/200 |
| 5,566,331 | A |   | 10/1996 | Irwin et al. |
| 5,721,818 | A |   | 2/1998  | Hanif et al. |
| 5,774,660 | A |   | 6/1998  | Brendel et al. |
| 5,781,550 | A |   | 7/1998  | Templin et al. |
| 5,812,930 | A |   | 9/1998  | Zavrel |
| 5,838,916 | A |   | 11/1998 | Domenikos et al. |
| 5,889,942 | A |   | 3/1999  | Orenshteyn |

(Continued)

FOREIGN PATENT DOCUMENTS

DE    19610840    9/1997

(Continued)

OTHER PUBLICATIONS

Japanese Office Action, App. No. 555298/2002, Jan. 9, 2007.

(Continued)

*Primary Examiner*—Le Luu
(74) *Attorney, Agent, or Firm*—Dorsey & Whitney LLP

(57) ABSTRACT

Access by multiple hosts, such as computers, to a data storage device by way of a network while maintaining data integrity. In one embodiment, a method for accessing the storage device includes acquiring a resource "lock" that provides exclusive access to one of the hosts at a time. In another embodiment, the file systems of a first and second host provide file system attributes stored in a storage device to provide mutually exclusive access for each host to free blocks of the device. In another embodiment, a networked system contains a first host having exclusive direct access to a storage device over a digital network. A second host requiring access to the storage device communicates with the first host by way of the digital network. File access requests generated by the second host are transferred by a redirection filter driver within the second host to the first host.

29 Claims, 14 Drawing Sheets

U.S. PATENT DOCUMENTS

| | | | |
|---|---|---|---|
| 5,987,523 | A | 11/1999 | Hind et al. |
| 5,987,627 | A | 11/1999 | Rawlings, III |
| 5,999,808 | A | 12/1999 | Ladue |
| 6,047,307 | A * | 4/2000 | Radko ................. 718/100 |
| 6,085,234 | A | 7/2000 | Pitts et al. |
| 6,128,644 | A | 10/2000 | Nozaki |
| 6,128,690 | A | 10/2000 | Purcell et al. |
| 6,167,490 | A | 12/2000 | Levy et al. |
| 6,175,869 | B1 | 1/2001 | Ahuja et al. |
| 6,216,202 | B1 | 4/2001 | E'Errico |
| 6,314,465 | B1 | 11/2001 | Paul et al. |
| 6,317,775 | B1 | 11/2001 | Colie et al. |
| 6,327,594 | B1 | 12/2001 | Van Huben et al. |
| 6,345,300 | B1 | 2/2002 | Bakashi et al. |
| 6,347,095 | B1 | 2/2002 | Tang et al. |
| 6,356,915 | B1 | 3/2002 | Chrchetkine et al. |
| 6,360,265 | B1 | 3/2002 | Falck et al. |
| 6,366,988 | B1 | 4/2002 | Skiba et al. |
| 6,389,432 | B1 | 5/2002 | Pothapragada et al. |
| 6,393,569 | B1 | 5/2002 | Orenshteyn |
| 6,404,766 | B1 | 6/2002 | Kitai et al. |
| 6,421,753 | B1 | 7/2002 | Hoese et al. |
| 6,449,647 | B1 | 9/2002 | Colby et al. |
| 6,470,389 | B1 | 10/2002 | Chung et al. |
| 6,510,164 | B1 | 1/2003 | Ramaswamy et al. |
| 6,518,965 | B2 | 2/2003 | Dye et al. |
| 6,523,066 | B1 * | 2/2003 | Montroy et al. ............ 709/229 |
| 6,529,996 | B1 | 3/2003 | Nguyen et al. |
| 6,539,446 | B1 * | 3/2003 | Chan ................. 710/200 |
| 6,578,111 | B1 | 6/2003 | Damron et al. |
| 6,594,677 | B2 | 7/2003 | Davis et al. |
| 6,598,068 | B1 * | 7/2003 | Clark ................. 718/104 |
| 6,609,167 | B1 | 8/2003 | Bastiani et al. |
| 6,647,016 | B1 | 11/2003 | Isoda et al. |
| 6,732,104 | B1 | 5/2004 | Weber |
| 6,760,783 | B1 | 7/2004 | Berry |
| 6,807,581 | B1 | 10/2004 | Starr et al. |
| 6,823,458 | B1 * | 11/2004 | Lee et al. ................. 726/16 |
| 6,834,326 | B1 | 12/2004 | Wang et al. |
| 6,894,981 | B1 | 5/2005 | Coile et al. |
| 6,941,576 | B2 | 9/2005 | Amit |
| 7,010,303 | B2 | 3/2006 | Lewis et al. |
| 7,069,312 | B2 | 6/2006 | Kostic et al. |
| 7,069,350 | B2 | 6/2006 | Fujita et al. |
| 7,076,690 | B1 | 7/2006 | Todd et al. |
| 7,251,704 | B2 | 7/2007 | Solomon et al. |
| 7,277,955 | B2 | 10/2007 | Elliott |
| 7,376,133 | B2 | 5/2008 | Gettala et al. |
| 7,383,229 | B2 | 6/2008 | Jacoby |
| 2002/0069245 | A1 | 6/2002 | Kim |
| 2003/0014569 | A1 | 1/2003 | Kim |
| 2003/0018403 | A1 | 1/2003 | Braun et al. |
| 2003/0028614 | A1 | 2/2003 | Jeon |
| 2003/0172149 | A1 * | 9/2003 | Edsall et al. ................. 709/224 |
| 2003/0225834 | A1 | 12/2003 | Lee et al. |
| 2004/0068563 | A1 * | 4/2004 | Ahuja et al. ................. 709/225 |
| 2004/0111422 | A1 * | 6/2004 | Devarakonda et al. ...... 707/100 |
| 2004/0117813 | A1 | 6/2004 | Karaoguz et al. |
| 2004/0220933 | A1 * | 11/2004 | Walker ................. 707/8 |
| 2004/0267706 | A1 * | 12/2004 | Springer et al. ................. 707/3 |
| 2005/0042591 | A1 | 2/2005 | Bloom et al. |
| 2005/0110768 | A1 | 5/2005 | Marriott et al. |
| 2005/0149682 | A1 | 7/2005 | Kim |
| 2005/0193017 | A1 | 9/2005 | Kim |
| 2005/0193189 | A1 | 9/2005 | Kim |
| 2006/0004935 | A1 | 1/2006 | Seto et al. |
| 2006/0010287 | A1 | 1/2006 | Kim |
| 2006/0045130 | A1 | 3/2006 | Kim |
| 2006/0067356 | A1 | 3/2006 | Kim |
| 2006/0069884 | A1 | 3/2006 | Kim |
| 2006/0155805 | A1 | 7/2006 | Kim |
| 2007/0008988 | A1 | 1/2007 | Kim |

FOREIGN PATENT DOCUMENTS

| | | |
|---|---|---|
| DE | 10038142 | 2/2001 |
| JP | 10-113469 | 5/1998 |
| JP | 10-271562 | 10/1998 |
| JP | 11007404 | 1/1999 |
| JP | 11-114224 | 4/1999 |
| KR | 10-2000-72493 | 12/2000 |
| KR | 10-2001-0088528 | 9/2001 |
| WO | WO99/03297 | 7/1999 |
| WO | WO00/29529 | 5/2000 |

OTHER PUBLICATIONS

Japanese Office Action, App. No. 513300/2003, Feb. 6, 2007.

Blunden et al., "Storage Network Virtualization: What's it all about?", ibm.com/redbooks, XP-002286341, pp. 1-110, Dec. 2000.

Klein, Yaron, "Storage Virtualization with iSCSI Protocol", Internet Draft, XP-015030964, pp. 1-15, Nov. 2, 2000.

Schulz, Greg, "SAN and NAS; Complementary Technologies", http://www.mti.com/white_papers/WP20002.pdf, XP-002201566, pp. 1-7, May 1, 2000.

* cited by examiner

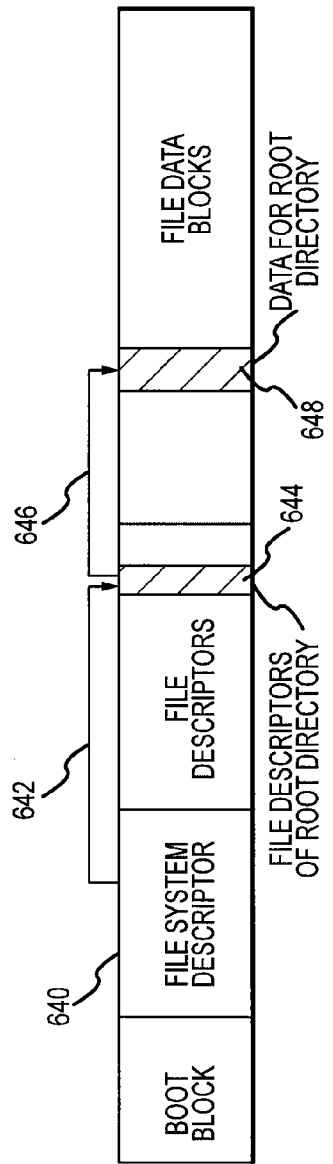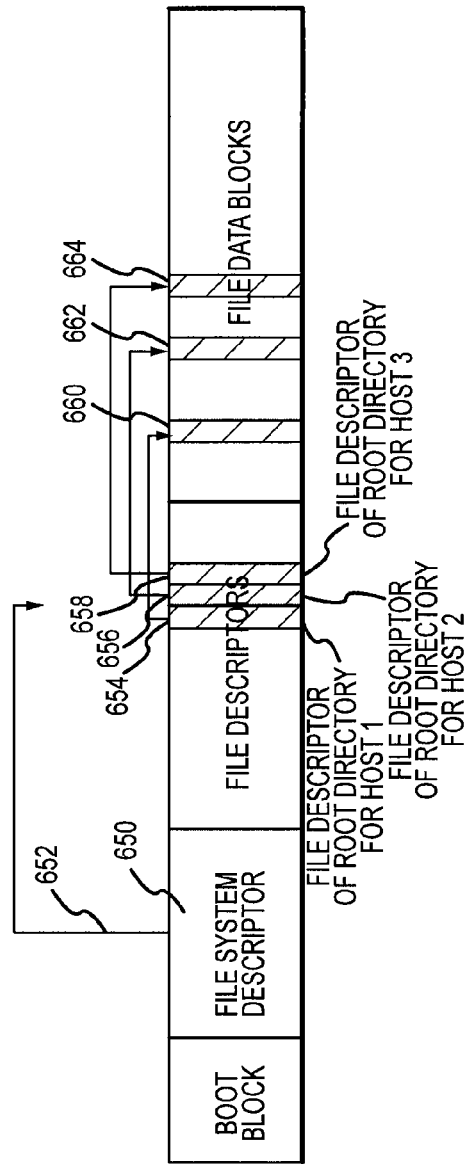

SYSTEM USING A SINGLE HOST TO RECEIVE AND REDIRECT ALL FILE ACCESS COMMANDS FOR SHARED DATA STORAGE DEVICE FROM OTHER HOSTS ON A NETWORK

CROSS-REFERENCE TO RELATED APPLICATIONS

This application claims the benefit of the following: U.S. Provisional Application Ser. No. 60/506,829, entitled "Device-Level Data Integrity Scheme for Data Devices Shared by Multiple Hosts through LAN," filed Sep. 26, 2003; U.S. Provisional Application Ser. No. 60/590,722, entitled "Low-Level Communication Layers and Device Employing Same," filed Jul. 22, 2004; and U.S. Provisional Application Ser. No. 60/581,691, entitled "File System Features That Enable a Storage Device to Be Shared Directly by Multiple Hosts at Device Level," filed Jun. 21, 2004. These applications are hereby incorporated by reference in their entirety.

BACKGROUND OF THE INVENTION a. Field of the Invention

The invention relates generally to a data storage device shared by multiple hosts by way of a network. More specifically, the invention relates to efficient access by multiple hosts of a data storage device over a network while maintaining the data integrity of the storage device.

b. Background of the Invention

Generally, hosts, as referred to herein, are electronic devices that employ data storage devices to store digital data for later retrieval and processing by the host. Hosts include, but are not limited to, computers (including desktop personal computers, laptop personal computers and workstations), personal digital assistants (PDAs), digital audio systems, digital television sets, television set-top boxes, digital game devices, smart phones, hand-held computers and other digital data processing devices. Data storage devices include, but are not limited to, hard disk drives, tape drives, flash memory units, and compact disc (CD) and digital versatile disc (DVD) drives. Further, the data written to or read from a storage device may take any of a variety of forms, including, for example, numerical, textual, audio and video data.

Often, data storage devices are not connected directly with a host, but instead communicate with the host via an intermediate electronic device called a device controller, which couples a data storage device with a central processing unit (CPU) and/or logic memory of the host, thus providing a mechanism for transferring data therebetween. Generally, the host also employs its operating system (i.e., the software resident on a host that controls the overall operation of the host) to facilitate communication between the CPU and/or logic memory and the device controller. For example, FIG. 1 depicts a typical hardware configuration for a computer system. A device controller 11 attached to a system bus 9 of a computer system enables data transfers between data devices 12, 13, and a CPU 3 and logic memory 4. As shown in FIG. 1, the device controller 11 may control one or more data storage devices.

Generally, in situations in which a data storage device is to be shared between two or more hosts, the storage device is not shared among the hosts directly at device level. Instead, the storage device often resides within one of the hosts involved, while the remaining hosts communicate with the data storage device by way of the host containing the data device. Typically, communication between the hosts occurs via a network file system. In general, a file system (for example, the NT File System (NTFS) employed by Microsoft Windows®) is the portion of an operating system responsible for the storage and tracking of files, and a file system that cooperates with other file systems over a network is termed a network file system. Typically, maintaining a stable state in such a system requires that all file write operations by one host, including the writing of any file directory information and other file "meta-data," be allowed to complete prior to allowing access by another host.

However, in such a network a complete computer system or host providing a network file system is required for each data storage device added to the network, thus significantly increasing the cost of the system. More importantly, the multiple hosts possess a file system dependency when sharing data at the file system level, as all of the hosts involved must agree on a particular network file system protocol. Further, when a change in the network file system is required, that change must be implemented in all hosts involved. In addition, the usage of files remotely accessible through network file systems typically is limited compared to what is possible by way of direct access of the files from a data storage device, such as a hard disc drive.

Sharing a storage device directly at the device level through a network provides certain advantages over indirect sharing of the storage device via network file systems. Direct sharing tends to be more efficient in terms of latency and access times. Direct sharing is more cost effective because less expensive hardware, in the form of a network device controller may be used instead of an entire computer system, which allows direct connection of each storage device via a network. No additional operating system or file system software is required, which also eliminates the file system dependency problems and limitations identified above.

However, given that such a system provides no centralized control of data transfers between the hosts and the storage device, data integrity is a potential problem. For example, with each host of the system writing and reading various portions of the storage device, one host may easily overwrite portions of files previously written by another host, thus possibly causing partial or total loss of the data contained in the files.

To further explain, sharing a data storage device over a network presents unique challenges compared to, for example, those involved with sharing a network printer. A network printer is often shared by more than two host computers, but the nature of the data being transferred over the network necessitates the two situations be treated differently.

Print commands from computers to network printers apply only to complete files. As a result, all commands issued to a network printer are guaranteed to be serialized at the file level so that no overlapped or interleaved files may be printed. In other words, a file in the shared network printer environment cannot be divided into smaller portions to be interleaved with portions of other files to be printed.

However, files intended for a data storage device, such as a hard disk drive, are ultimately translated into one or more physical sectors of the data device by way of file system software. Further, no guarantee exists that the file will not occupy several discontinuous series of sectors on the data storage device. Therefore, different files from various hosts sharing the storage device may possibly be mapped onto overlapping sectors unless the file systems of the hosts cooperate in some manner.

Given the foregoing, systems and methods that allow multiple hosts to access a shared data storage device in an efficient manner without loss of data integrity would be advantageous.

BRIEF SUMMARY OF THE INVENTION

Generally, embodiments of the present invention allow read and/or write access by multiple hosts, such as computers or other information appliances, to a data storage device by way of a network while maintaining the data integrity of the data storage device. In one particular embodiment, a method for accessing the data storage device provides, in part, acquiring a resource lock, which provides exclusive access to one of the multiple hosts at a time. The host holding the lock may then directly access the storage device without interference from the other hosts. After accessing the storage device, the accessing host releases the lock on that storage device so that other hosts may then be allowed to access the storage device. The lock may be implemented entirely in software, hardware, or a combination thereof. In one embodiment, the lock is implemented within the data storage device, and the data storage device accepts and executes lock access commands issued by the multiple hosts.

In another embodiment, a networked system is provided which includes a data storage device and a plurality of hosts coupled to the storage device by way of a digital network. In addition, a resource lock is included which provides exclusive access to the data storage device to one of the plurality of hosts at a time. Digital networks employable for coupling the data storage device with the multiple hosts include, but are not restricted to, a local area network such as Ethernet (LAN), a wide area network (WAN), the Internet, a virtual private network (VPN), and any other digital network.

In another embodiment of the invention, a networked system with a data storage device shared by a plurality of hosts over a network utilizes a file system providing a "check out" attribute for each cluster of free blocks available for file storage. A host attempting to claim a cluster of free blocks analyzes the associated check out attribute to determine if another host has already claimed the cluster. If not, the host sets the check out attribute with a value indicating that it has claimed the cluster, thereby providing the host exclusive access to the cluster. In a further embodiment, a resource lock may be employed to protect the access to the check out attribute. Mutually exclusive access to other file system data structures may be provided in a similar fashion.

In a further embodiment, a first host has exclusive direct access to a data storage device, which is accessed by way of the host's local file system over a digital network. A second host requiring access to the data storage device communicates with the first host by way of the digital network. File access requests generated by the second host are redirected away from its own local file system to the first host by a redirection filter driver. The first host maintains direct access to the storage device while the second host communicates with the device through the first host's file system. In one embodiment, the first and second hosts each include a file network system for transferring file access requests from the second to the first host. In another embodiment, each of the first and second hosts employ a network connection (such as a socket connection program) to allow the second host to issue file access requests through the first host.

Additional embodiments and advantages of the invention will be realized by those skilled in the art upon reading the detailed description of the invention.

BRIEF DESCRIPTION OF THE DRAWINGS

FIG. 12 depicts a process of accessing a root directory in a conventional file system.

FIG. 13 depicts a process of accessing multiple root directories of a file system according to an embodiment of the invention.

DETAILED DESCRIPTION OF THE INVENTION

Figure 1:
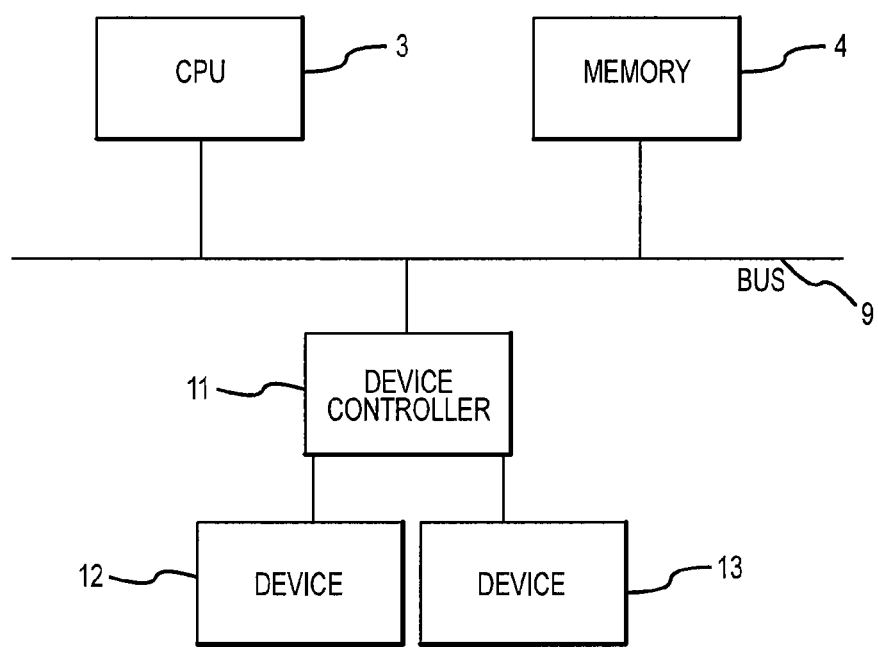
FIG. 1 depicts a block diagram of a typical data storage device connection within a computer system.
Figure 2:
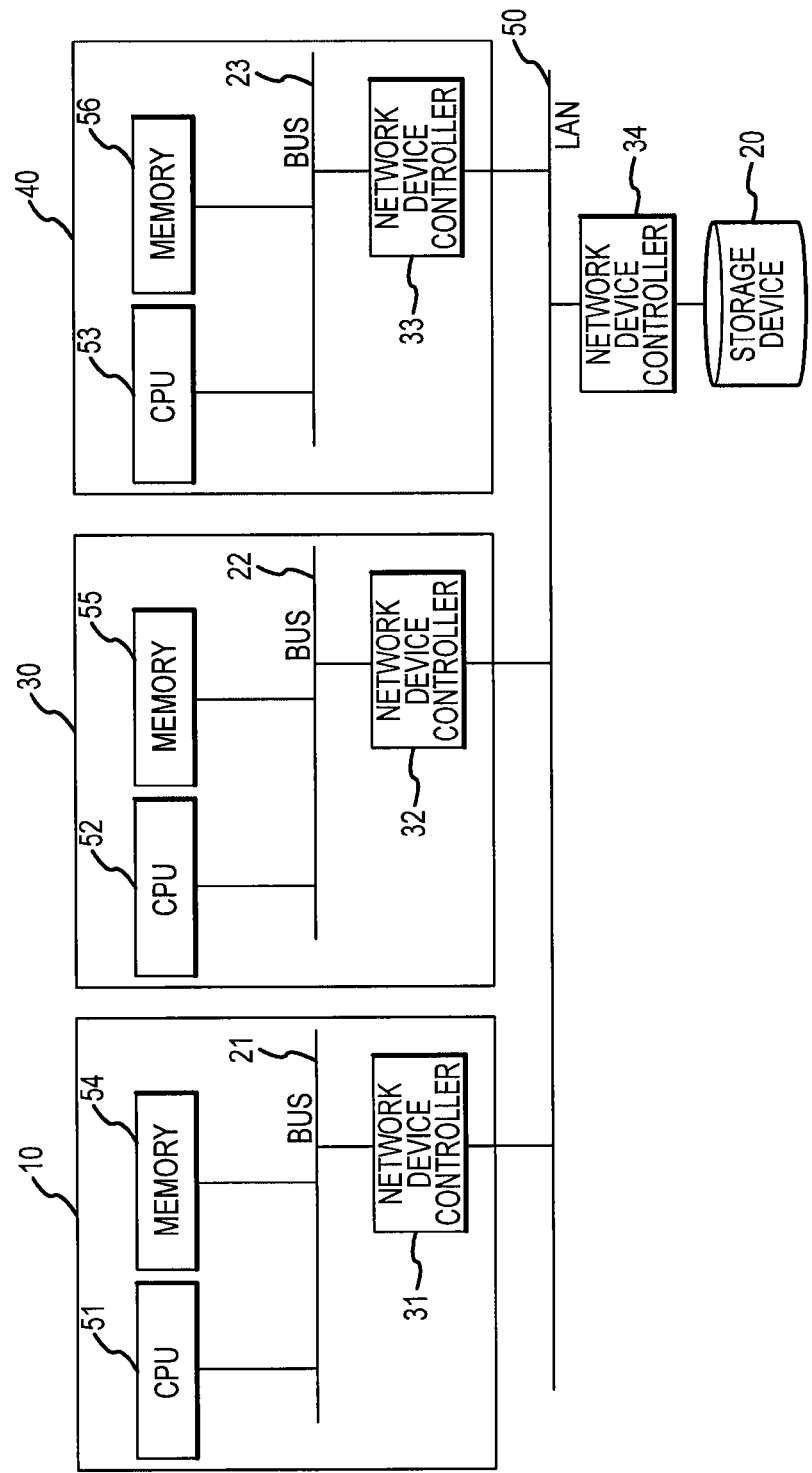
FIG. 2 depicts a block diagram of a computer network connecting multiple host computers with a data storage device at the device level.

One embodiment of the invention allows direct connection of one or more hosts to one or more data storage devices, as illustrated in FIG. 2. A direct connection between a first host 10 and a data storage device (or subsystem) 20 over a network, such as a LAN 50, (and also between a second host 30 and a third host 40, and the data storage device 20) may permit the hosts 10, 30, 40 to access the storage device without requiring a server to manage such access. Also, such direct connection allows the hosts to circumvent the use of a network file system, as described above, and access the data storage device at a lower, more efficient level of abstraction.

Typically, the connection between the hosts 10, 30, 40 and the data storage device 20 is facilitated by way of a network device controller 31, 32, 33 and 34 identified with each host 10, 30, 40 and data storage device 20, respectively. In addition, each host 10, 30, 40 normally includes a system bus 21, 22, 23, respectively, with a central processing unit (CPU) 51, 52, 53 and logical memory 54, 55, 56, coupled with the network device controller 31, 32, 33, to communicate with the storage device 20.

Figure 3:
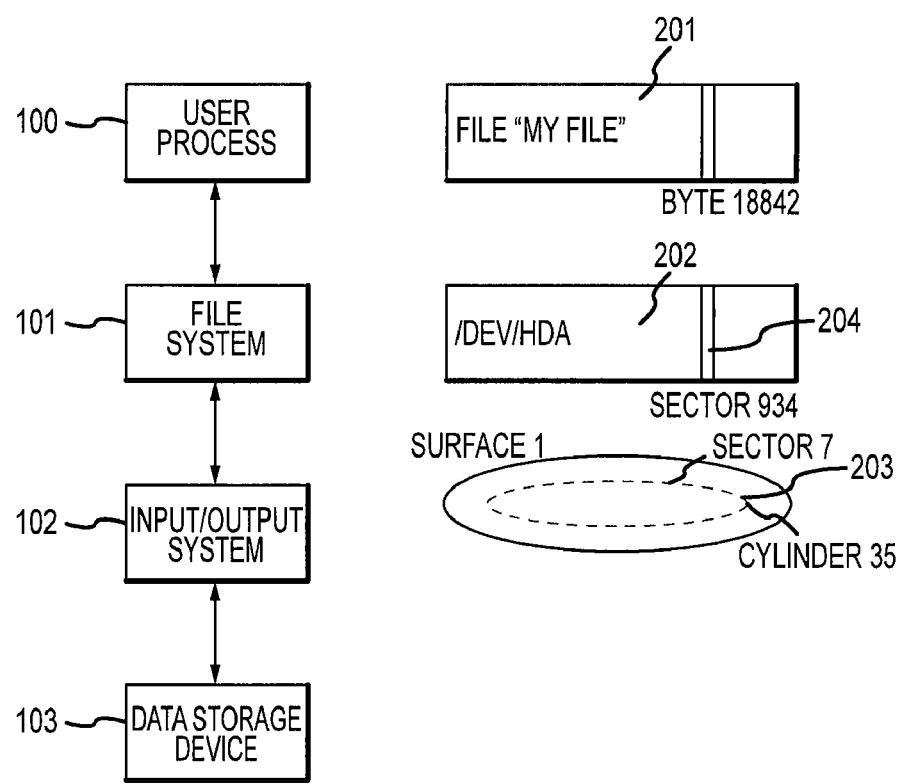
FIG. 3 depicts a block diagram of a typical data abstraction hierarchy of a computer system wherein each layer of the hierarchy provides a different view of a file.

FIG. 3 provides a graphical representation of the various levels of abstraction by which data stored on a data storage device may be viewed. At the top of the abstraction hierarchy is a user process 100 (e.g., a user application, an assembly language program, an operating system daemon, or the like) executed on a host computer accessing the storage device 103, which refers to a file 201 by a file name (such as "MyFile" in FIG. 3), the file 201 being viewed as a sequence of bytes of arbitrary length. At a lower level of abstraction, a file system 101 of the computer system views that same data as a collection of data sectors 204 within a linear array of "logical sectors" or "blocks" 202, the blocks 202 of the array typically being numbered from zero up to some maximum sector number. Below that, a software device driver (usually including a computer program having instructions to operate or control the storage device 103), in conjunction with an input/output system 102 may view the data of the file in a fashion closer to its actual physical configuration 203, or layout, within the data storage device 103. Generally, an input/output system, such as the Basic Input/Output System, or "BIOS," of a personal computer, translates operating system calls for access to a data storage device into a form understandable by that device. For example, assuming the use of a hard disk drive as a data storage device, the input/output system 102 may recognize the file as a set of data sectors arranged across one or more disk surfaces, or "platters." Further, each platter is then normally divided into several tracks, or "cylinders," which in turn are typically divided into multiple physical sectors. In many hard disk drives, each logical block 202 corresponds to a physical sector of the drive. Other physical media, such as tape drives, CDs or DVDs, exhibit other physical data sector layouts, all of which are compatible with and embraced by the present invention. Data abstraction hierarchies other than that shown in FIG. 3 are also possible. In fact, any data abstraction hierarchy and/or any data layout currently known or otherwise compatible with digital data storage is encompassed by the present invention.

Most host computer systems also utilize a data buffer, or "cache," normally implemented inside the main logical memory of the computer system and logically residing within the data hierarchy between the file system 101 and the input/output system 102. The buffer is usually employed to increase system performance by saving a copy of a portion of often-used (or recently used) data stored on the data storage device 103 for future computer CPU or main memory accesses to shorten the time required to access that data. Due to the limited size of the buffer compared to the data storage device 103, the buffer typically is able to hold only a small percentage of the total amount of data residing in the data storage device 103 at any given time.

Figure 4:
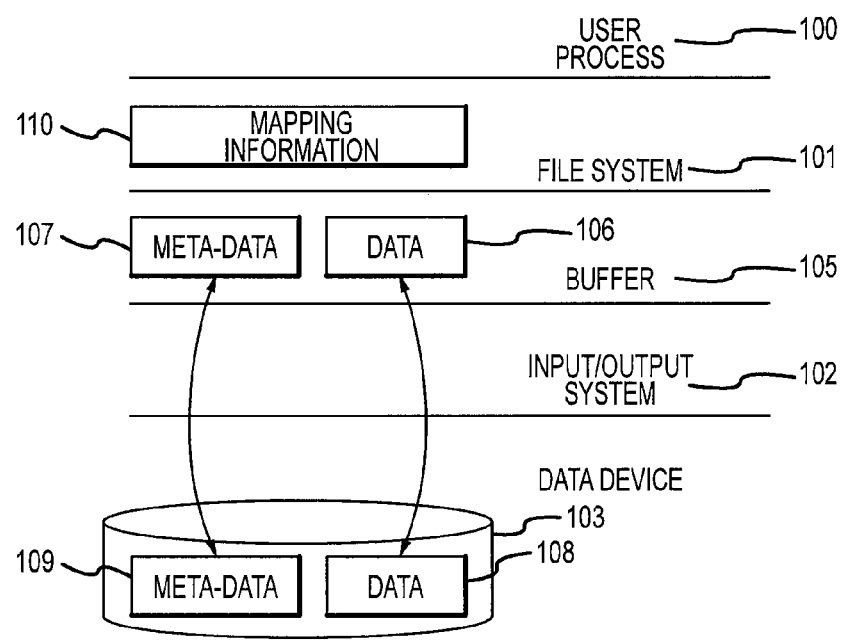
FIG. 4 depicts a block diagram describing a file access process of a typical computer system employing the data abstraction hierarchy of FIG. 3.

FIG. 4 depicts a buffer system 105 placed within the data access hierarchy of FIG. 3. Shown within the buffer 105 is a copy 106 of a portion of user data 108 residing in the data storage device 103. However, when the copy 106 is valid (e.g., the copy 106 exactly matches the contents of the corresponding data 108 in the data storage device 103), all requests to access the corresponding data 108 of the data storage device 103 will instead access the copy 106 in the buffer 105 without directly accessing the data 108 resident on the device 103.

In the example of FIG. 4, user data 106 is read from the buffer 105 instead of the data storage device 103 if the user data 106 in the buffer 105 is valid. During write operations, all user data to be written to the data storage device 103 will be copied into either a free space of the buffer 105, or into an area of the buffer 105 holding a copy of that data. The physical sectors holding the user data 108 of the data storage device 103 are written from the copy 106 in the buffer 105 at a later time, depending on the particular buffer flushing strategy employed. The details of various caching and flushing strategies are well-known in the art, and are not critical to the various embodiments of the invention described herein.

As illustrated in FIG. 4, the buffer 105 also normally maintains a cache of meta-data 107 corresponding to and describing the copy 106 of user data. Meta-data, such as file descriptors, are data necessary for mapping portions of files 201 to blocks 202 for proper storage and retrieval of file data. Meta-data may include, for example, a file's length and physical location on a data storage device 103. This information is stored on physical sectors of the data storage device 103 as meta-data 109 associated with the data storage device 103. Depending on the implementation of the particular file system 101 employed, additional mapping information 110, such as certain file directories found in the data storage device 103, may also be cached as meta-data in various data structures of the file system 101 itself.

Figure 5:
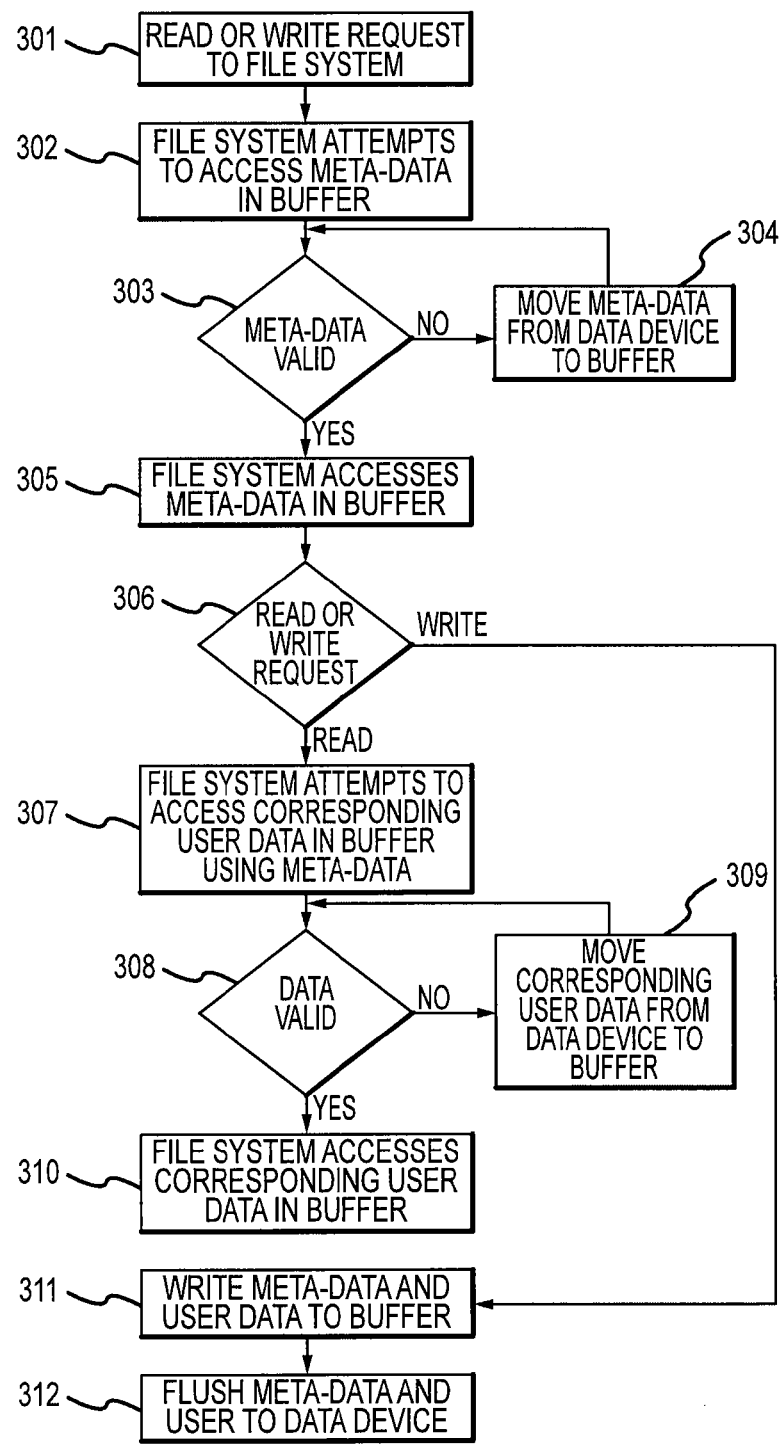
FIG. 5 depicts a flow diagram describing a typical file read or write operation.

FIG. 5 shows a generalized method of reading or writing data files (or portions thereof) normally employed by a single host directly connected to a single data storage device, using the data hierarchy of FIG. 4. In operation 301, the file system 101 receives a file read or write request from a user process 100. Following receipt, in operation 302 the file system 101 attempts to access a copy 107 of the meta-data in the buffer 105 that contains the mapping information describing the translation from the file 201 to the corresponding blocks 202. In operation 303, the system determines whether the copy 107 of the meta-data stored in the buffer 105 is valid. If the meta-data 107 is valid, operation 305 is executed. If, however, the meta-data 107 is invalid or not present in the buffer 105, the input/output system 102 executes operation 304 and converts the location of the blocks 202 of the required meta-data into the corresponding location of physical sectors 203 of the data storage device 103, reads the corresponding meta-data 109 from the physical sectors 203 of the data storage device 103, and copies the meta-data 109 into the buffer 105, resulting in a valid copy 107 of the meta-data in the buffer 105. Optionally, the file system 101 may perform operation 303 once again to ensure the meta-data 107 in buffer 105 is valid.

In operation 305, with a valid copy 107 of the meta-data now available in the buffer 105, the file system 101 reads the copy 107. Continuing with operation 306, the file system 101 determines whether the requested data access requires a read or write of file data. In the case of a read operation, operation 307 is executed, in which the file system 101 determines the proper blocks 202 of the actual user data desired and attempts to access a valid copy 106 of the user data in the buffer 105. In operation 308, the file system 101 determines if the copy 106 of user data is not valid or is nonexistent in the buffer 105. If the copy 106 of user data is invalid or not present, operation 309 is performed, in which the input/output system 102 converts the location of the blocks 202 holding that data into the corresponding location of physical sectors 203 of the data storage device 103, reads the user data 108 from the physical sectors 203 of the data storage device 103, and copies the user data 108 into the buffer 105, resulting in a valid copy 106 of the user data in the buffer 105. Operation 308 then may be executed once again to ensure the copy 106 of the user data in the buffer 105 is valid. In operation 310, the file system 101 then reads the copy 106 of the user data from the buffer 105, thus completing the read request from the user process 100.

If, instead, the file system 101 determined in operation 306 that a write operation is involved, operation 311 is executed, in which the file system 101 uses the copy 107 of meta-data previously read from the buffer 105 in operation 305 and transfers the user data 106 and associated meta-data 107 to be written to an appropriate location in the buffer 105, thus making those portions of the buffer 105 valid. At some later time, when the buffer 105 is to be "flushed" (i.e., data in the buffer 105 is to be written to the data storage device 103), operation 312 is performed, in which the user data 106 and associated meta-data 107 in the buffer 105 are written to the data storage device 103 as user data 108 and meta-data 109 by way of the input/output system 102, thereby completing the write operation.

As mentioned earlier, allowing multiple hosts concurrent direct access to the data storage device 103 may cause data integrity problems in both the meta-data 109 and the file data 108 located on the data storage device 103, as well as any copies 106, 107 of that data in a buffer 105 of each host. For example, referring to FIG. 2, one host 10 might be in the process of updating a preexisting file resident on a storage device 20 by way of multiple write operations. Before completion of the update, a second host 30 may read the same file from the data storage device 103, thus receiving an intermediate and incorrect copy of the file.

In addition, the use of a buffer 105 within each of the hosts exacerbates any potential data integrity problems. For example, if each host is accessing copies 106, 107 of meta-data and file data from its own buffer 105, updates to those copies 106, 107 will not be seen by other hosts until that information is flushed from the buffer 105 and written to the data storage device 103. Accordingly, each host may be attempting to update the same data file in different ways, completely unaware that multiple, dissimilar copies of the same file exist, thus destroying the data integrity of that file.

To address this problem, one embodiment of the invention involves the use of a resource "lock" to prevent access to the data storage device 103 at the device level by more than one host at any particular time. Generally speaking, the lock is acquired by a host attempting access the storage device, including any reading or writing of a data file to the device 103, and is released after the access operation has been completed. In most embodiments, completion of a write command would include the host in possession of the lock flushing the contents of its buffer 105, thus ensuring the meta-data and file data of the data storage device 103 has been updated. Only one host may possess the lock at any one time, thereby prohibiting access to the data storage device by any other host. The lock may also be implemented as a "semaphore" or similar construct known in the art. Generally, a semaphore is a flag or similar indicator that is writable and readable by one or more hosts, and is used to relay a simple message between those hosts.

The lock itself may be implemented in several different ways. The lock may be implemented entirely in software (such as device driver or network protocol), although hardware implementations are possible as well, as are hybrid hardware/software implementations. In one embodiment, the data storage device 103 itself may internally store the value of the lock for access by each of the hosts using the device 103. All access and manipulation of the lock by the host would then be controlled, for example, by a device-level controller within or operably connected to the data storage device 103. In addition to lock control, the device-level controller may process standard device-level commands normally targeted for a data storage device, such as the commands associated with the Small Computer Systems Interface (SCSI) or Integrated Drive Electronics (IDE) interfaces known in the art.

Generally, a device-level controller is implemented by way of an embedded microcontroller system designed and employed to perform tasks specific to the control and maintenance of the associated data storage device, including the processing of device-level commands, as described above. Typically, such a system employs resources, in terms of algorithmic capability, speed and logical memory, minimally sufficient to perform its assigned duties in terms of data storage device control, but not to implement commands beyond device control. (For example, the microcontroller may respond to device-level command, but would not implement and run an operating system.) Accordingly, the term "computer," as is generally employed in the art, does not embrace a device-level controller of the embodiments of the present invention.

In some embodiments, the data storage device 103 (or associated controller) may provide lock control and access for the hosts by way of lock-specific commands that facilitate the checking and setting of the lock. For example, the data storage device 103 may provide an "acquire lock" command that provides both a checking and setting of the lock in one operation. In other words, if the lock is already held by another host, the data storage device 103 will return a failure indication to the requesting host. Otherwise, a success indication can be returned, indicating to the requesting host that the lock acquisition was successful, in which case the requesting host may proceed with accessing data on the data storage device 103. In another implementation, the requesting host may be able to specify a timeout period as a parameter of the acquire lock command so that the data storage device 103 attempts to acquire the lock for the requesting host for the timeout period if the lock is held by another host before returning a failure indication. In addition, the data storage device 103 would also support a "release lock" command to allow the host holding the lock to allow access by the other hosts. In another embodiment, a network device controller 34, as shown in FIG. 2, may implement the locking mechanism instead of the data storage device 103 of FIGS. 3 and 4.

In yet another implementation, the lock may be implemented by one of the hosts accessing the data storage device 103. Other hosts would then access the lock by making requests via the network to the host implementing the lock. In another embodiment, responsibility for maintaining the lock may be distributed among all or some subset of the hosts involved, with each host possessing a local copy of the state of the lock, including the identity of the host currently in possession of the lock. In that particular case, care must be taken to ensure that each of the hosts maintains a current copy of the state of the lock.

Figure 6:
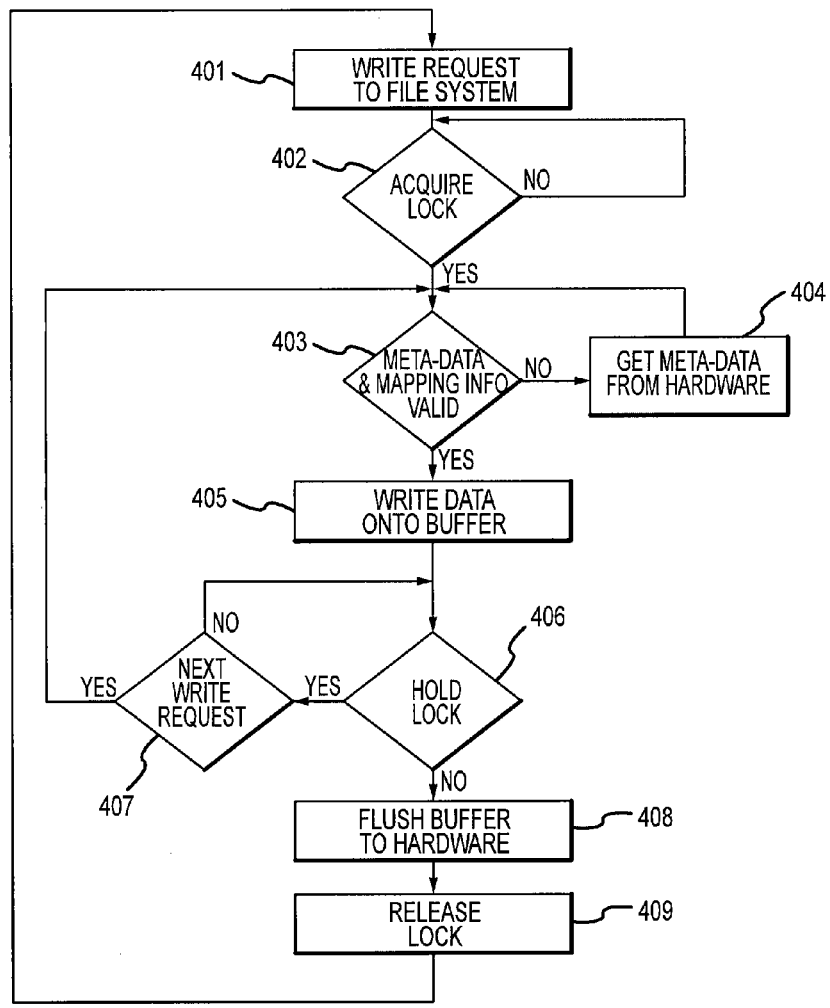
FIG. 6 depicts a flow diagram of a file write operation according to an embodiment of the invention employing a network of multiple hosts sharing a data storage device and a resource lock.

FIG. 6 generally shows the steps of a write operation of a file according to an embodiment of the invention employing a resource lock to enhance the data integrity of the file being written. Using the system of FIG. 4 as a template for a host and a data storage device, operation 401 is first executed, in which the user process 100 issues a file write request to the file system 101. In operation 402, the file system 101 first acquires the lock before initiating the actual write operation. As stated above, acquisition of the lock may be delayed if another host is already in possession of the lock. In one embodiment, the requesting host may "time out" if the lock has not been acquired within a predetermined period of time, thus allowing the host to complete other tasks before attempting to acquire the lock once again. During operation 402, the file system 101 may intermittently check for the lock explicitly, or such an intermittent check may be performed automatically by another software routine. Alternately, the file system may place a request for the lock, and then be interrupted by another software routine when the lock becomes available.

Once the lock is acquired, operation 403 is performed, in which the file system 101 checks for a valid copy 107 of the meta-data in the buffer 105. In some cases, the file system 101 may assume beforehand that the meta-data 107 in the buffer 105 is invalid if the previous lock holder was another host, thereby circumventing an exhaustive check of the buffer 105. In such a case, an identification of the last host to hold the lock may also be implemented in conjunction with the lock itself. For example, a host may write a specific file system data structure on the data storage device 103 after acquiring a lock indicating it is the most recent holder of the lock.

If the meta-data in the buffer 105 is not present or valid, operation 404 is executed, in which the corresponding meta-data 109 is read from the data storage device 103 (i.e., the data storage device 103) using the input/output system 102. Otherwise, the file system 101 may proceed to operation 405. Once operation 404 is complete, the file system 101 may again check if validity of the meta-data in the buffer 105 is valid in operation 403. With a valid copy 107 of the meta-data now in the buffer 105, operation 405 is performed, in which the file system 101 reads that copy 107 of the meta-data, translates the information for the file 201 into a set of blocks 202 containing the desired user data, and then writes the new data into the proper location in the buffer 105. In addition, the meta-data is updated based on any changes necessary due to the new user data to be written.

The file system 101 then determines in operation 406 if the host will hold the lock after the write operation. If not, in operation 408 the host flushes all file data and meta-data in the buffer 105 to the data storage device 103 using the input/output system 102 to perform the logical-to-physical sector translation before it releases the lock in operation 409. If the host holds the lock, the host then determines in operation 407 if another write request is pending. If so, the write procedure resumes by returning to operation 403. If there is no pending write request, the host determines if it will still hold the lock in operation 406 based on other criteria, such as anticipated near-term data storage device access requirements.

As a result, the lock mechanism prevents multiple hosts from simultaneously or concurrently writing to the data storage device 103 by allowing only one host at any time to hold the lock for writing operations. Accordingly, the writing by any host holding a lock is likely valid, because all previous write operations to the shared data storage device 103 by other hosts are fully recorded by flushing all user data 106 and meta-data 107 from the buffer 105 to the data storage device 103 before another host can acquire a lock.

In an alternative embodiment, all hosts connected to the data storage device 103 may cooperate to time-share access to the data storage device 103 by allocating a limited lock hold time to each host, thus preventing monopolization of the lock by any single host. The limited hold time may be invariant (for example, ten seconds per host), prioritized by host (for example, host A has a ten second lock while host B has a five second lock), or varying with some other parameter (for example, larger files may permit longer locks, lock duration may be determined by data throughput speed of the storage device and the host, and so forth).

Figure 7:
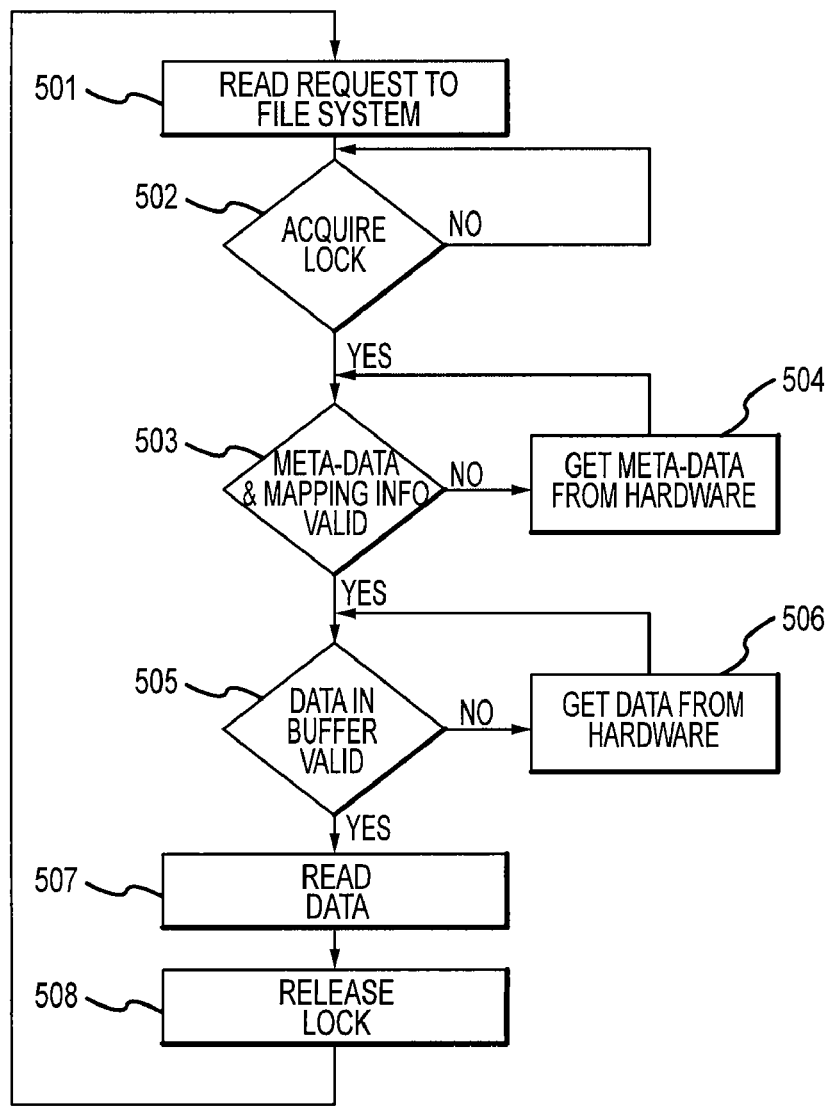
FIG. 7 depicts a flow diagram of a file read operation according to the embodiment of the invention associated with FIG. 6.

FIG. 7 illustrates the process flow of a read operation, according to another embodiment of the invention, utilizing a lock to guarantee the file data read is consistent with the data resident on the data storage device 103. In operation 501, the file system receives a read request from a user process 100. Thus, in operation 502, the file system 101 acquires a lock before initiating a read operation. Once the file system 101 acquires the lock, operation 503 is executed, in which the file system 101 determines if the copy 107 of meta-data and other mapping information is present and valid in the buffer 105. If not, in operation 504 the file system 101 reads the corresponding meta-data 109 from the data storage device 103 by way of the input/output system 102 into the buffer 105. The file system 101 may then return to operation 503 to ensure the validity of the meta-data 107 in the buffer 105. In operation 505, the file system 101 reads the copy 107 of the valid meta-data from the buffer 105, performs a translation from the name of the file 201 to a set of blocks 202, and searches the buffer 105 for a valid copy 106 of the file data corresponding to the blocks 202. If a copy 106 of the file data is not in the buffer 105, or such a copy is not valid, the file system 101 performs operation 506, in which the file data 108 is read from the data storage device 103. Again, at this point the file system 101 may return to operation 505 to ensure the validity of the file data 106 in the buffer 105. With a valid copy 106 of the file data in the buffer 105, the file system 101 executes operation 507 and completes the read request by obtaining the data copy 106 from the buffer 105, before releasing the lock in operation 508. Since the file system 101 has not written any meta-data or file data to the buffer 105, flushing the buffer prior to releasing the lock is not required, as was the case during the write operation described in FIG. 6. In alternative embodiments, the file system 101 may retain the lock to execute further read or write operations prior to releasing the lock.

In one implementation, the reading procedures of FIG. 7 may be performed while bypassing the procedures of acquiring and releasing the lock (steps 502, 508) if the meta-data 109 and file data 108 are read directly from the data storage device 103 instead of the buffer 105. If so, any problems with the contents of the buffer 105 remaining consistent with the data storage device 103 are eliminated. However, in some cases, the data read by a host that has not acquired a lock may be in a partially-modified state if another host holding the lock is in the process of writing the same file to the data storage device 103. As a result, the adequacy of reading data without performing the locking and unlocking operations may be determined by whether data that has been partially-modified is acceptable for host use. In addition, a time-share lock scheme may be implement for the read operation of FIG. 7, as presented above in the discussion of FIG. 6.

The write and read operations shown in FIG. 6 and FIG. 7, respectively, can be implemented by adding filter driver software atop the existing file system 101 without modifying the existing file system or adding an extra file system. Effectively, the filter driver may be layered into or atop the file and/or operating systems. In one embodiment, the filter driver software intercepts the read and write requests to the existing file system software 101 before it acquires the lock. For example, the filter driver software may verify the validity of the meta-data 107 and user data 106 in the buffer system 105 before it notifies the file system 101 about the validity, as well as perform the locking and unlocking procedure.

In another embodiment of the invention, the data integrity of a data storage device shared among multiple hosts over a network at the device level is maintained by a set of features or data structures provided by the file systems of the hosts. These structures provide a mechanism by which free blocks (i.e., blocks not currently written with valid user data or meta-data) of the data storage device are allocated to each host in a mutually exclusive manner. Considering this particular embodiment of the invention involves enhancements to the typical file system currently available, a more detailed discussion of file systems and their operation is provided.

A file system, which typically is the largest unit of data structure identified with a persistent data storage device, normally includes a collection of files, file descriptors, directories and other file-system-related information. The file system is stored on a "logical disk," which can be a physical disk (e.g., a hard disk drive), a disk partition (i.e., some identified portion of a physical disk), several physical disks, or some other physical manifestation of a data storage device. From the file system's standpoint, a logical disk is composed of a large, one-dimensional array of logical blocks, as described above.

Figure 8:
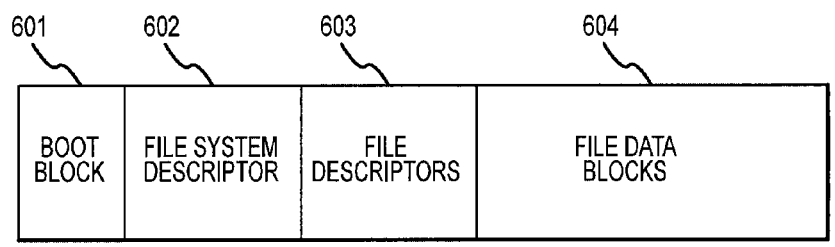
FIG. 8 depicts a typical logical view of a conventional file system on a data storage device.

FIG. 8 presents an example disk block layout of a file system. Typically, the first block is reserved for a boot block 601, which is the first disk block read by a computer system to determine where on the disk to retrieve the operating system and other necessary information to initialize the computer after a reset has occurred. A file system descriptor 602 (often called a "super block" in the UNIX operating system) contains information about the file system as a whole, since the file system is viewed as an object or entity in and of itself, and thus requires a data structure to represent it. The file system descriptor 602 defines the total size of the file system in blocks, the size of the file descriptor area, the location of the root directory (i.e., the top directory in a hierarchically-arranged file structure), and other file system meta-data. One other important item of information defined in the file system descriptor 602 is the first block of the free block list.

File descriptors 603 (often called "inodes" in UNIX) contain all meta-data associated with a particular file, including the actual block addresses on the data storage device where the file data is located. Other meta-data in the file descriptors 603 normally include the owner of the file, file protection information, time of creation, time of last modification, time of last use, and other information related to the specific file.

In most file system implementations, directories, which essentially are logical collections of files and other directories, are actually implemented as files, so each directory will have a file descriptor in the file descriptor area and occupy some data blocks in the data block area 604. In other words, no special areas of the storage device are reserved within the file system for directories.

Generally, at some point in time, some plurality of the data blocks on a data storage device are allocated or occupied by file data and file descriptors, while some blocks remain unallocated, or "free." All allocated blocks are linked to a file descriptor so that file data can be traced by starting with the corresponding file descriptor. As files grow, more free blocks are allocated to the files as necessary. Accordingly, file systems typically maintain a list of free blocks for quick allocation of those blocks to files.

FIG. 8 shows a logical view of a typical file system. The actual locations of each entity depicted may be allocated across the entire allotment of disk blocks. For example, the file descriptors may be located in any of a number of areas on the disk, as they may be positioned with the file names in the directories, in a special area of the disk reserved for file descriptors, or among the disk blocks containing the actual file data.

Figure 9:
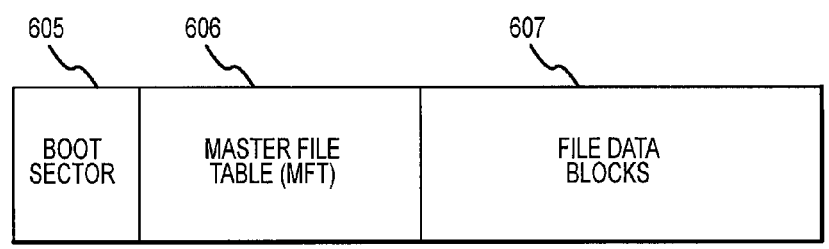
FIG. 9 depicts a logical view of a Microsoft Windows® NTFS partition.

Different file systems may also define varying structures containing the information required to implement the file system. For example, FIG. 9 depicts a logical view of a partition of the Microsoft Windows® NT File System (NTFS), in which information on the file system itself and the starting block number of the Master File Table (MFT) 606 is stored in a boot sector 605. The Master File Table 606 holds meta-data concerning every other file and directory contained in the file data blocks 607 of the NTFS partition. The Master File Table 606 also contains sixteen entries, or records, reserved for various special meta-data files, including a free block list.

Traditional file systems are designed such that all free blocks are managed by a single host because the data storage device is normally attached to the inner system bus of the host. As a result, only the single host may directly access the device. However, if two different hosts are able to access the device directly at the device level, as would be the case when a storage device is coupled with the hosts directly via a network, each host may allocate logical blocks from the same free block list independently, thus potentially allocating identical blocks to different files. This, in turn, would corrupt the consistency and integrity of the entire file system.

Figure 10:
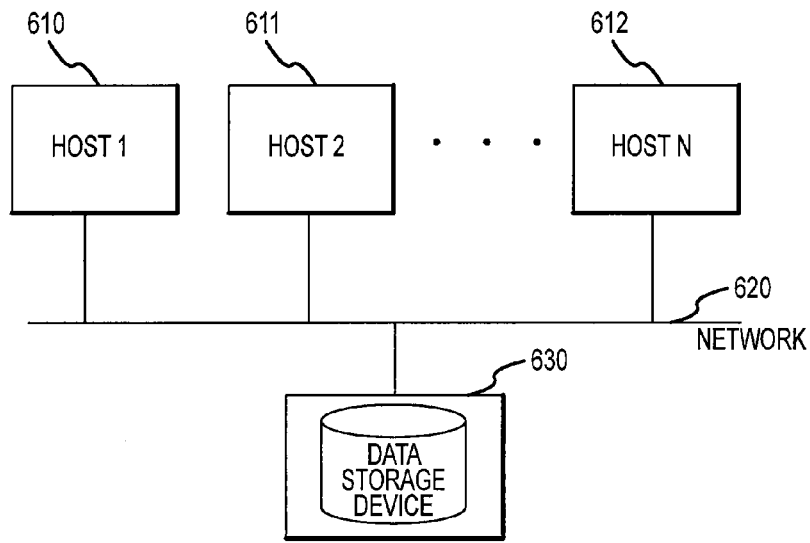
FIG. 10 depicts a typical network of hosts that share a data storage device directly at the device level.

FIG. 10 shows an exemplary system of multiple host computers 610, 611, 612 sharing a single shared data storage device 630 over a network 620 directly at the device level, while relying solely on the local file systems of the hosts 610, 611, 612 to manage the storage device 630. Sharing a hard disk drive or other data storage device directly at the device level is distinguished from sharing a storage device by multiple hosts indirectly via a separate server through a distributed file system by way of the data integrity support provided by a distributed file system. Direct accessing of a remote hard disk drive by one or more computing devices is discussed in U.S. Provisional Application Ser. No. 60/592,722, entitled "Low-Level Communication Layers and Device Employing Same," incorporated by reference herein in its entirety.

For example, some distributed file systems, such as xFS ("x" File System) and GFS (Global File System) utilize a server for managing the meta-data of the file system, including the free block list. Each client host consults the server before the client acquires free blocks for writing a file. The server allocates free blocks, but does not control actual data written to the storage device. This mechanism allows the clients to write and read data blocks onto and from the data storage device directly without relaying the user data to and from the server. However, this mechanism does not allow the hosts to share the storage device directly at the device level without server intervention. Thus, since only the server controls the allocation of free blocks, and each client host must consult the server to obtain free blocks, the file system cannot be corrupted on the basis of allocating free blocks to multiple clients. However, such a mechanism suffers from scalability and performance overhead limitations since a single server intervenes in all free block allocation to provide proper metadata management and cache coherency. Thus, computer networks employing a distributed file system generally lack the performance associated with a network in which multiple computers access a shared data storage device directly at the device level without the assistance of a file server.

Figure 11:
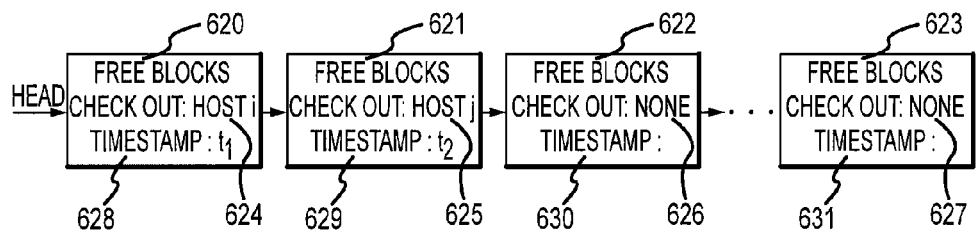
FIG. 11 depicts a free block list of a file system according to an embodiment of the invention.

In order for multiple hosts sharing the same storage device to maintain free blocks of the storage device in a manner such that no block is allocated to more than one particular file at a time, the total number of free blocks may be divided into multiple, mutually exclusive sets of free blocks, with each set being accessible to only one particular host at a time. For example, FIG. 11 shows a logical view of a list of free blocks according to various embodiments of the invention. Each of a first, second, third and fourth entry 620, 621, 622, 623 of the free block list, with each entry denoting a "cluster," or mutually exclusive set, of free blocks. Therefore, each free block is included in only one specific free block cluster. Although FIG. 11 depicts the logical view of the entries denoting the free blocks in the form of a list, alternative embodiments of the invention are not limited to a specific data structure, such as a list structure. For example, in many file system implementations entries of free blocks are maintained as a form of "bitmap," wherein each bit represents a cluster on the physical disk, thus identifying whether the cluster is free or has been allocated to a file.

In further reference to FIG. 11, each free block cluster is associated with a "check out" attribute 624, 625, 626, 627. Each host computer can check out the mutually exclusive free block clusters only when the clusters are not currently checked out by another host. When a host checks out or claims one or more free block clusters, the host is responsible for setting the check out attribute 624, 625, 626, 627 for each claimed cluster using its host ID. To provide additional security, some embodiments may employ a resource lock (as described above) in the course of setting the check out attribute 624, 625, 626, 627 to prevent a race condition among hosts contending for the same free blocks. Once a host checks out a set of free block clusters, the host may allocate to a file any of the free blocks from the free block clusters that have been checked out since those blocks are reserved exclusively for the use of the host by way of the check out process, thus preventing any other host from checking out those same blocks.

Any checked out blocks not ultimately allocated to a file are subsequently returned by the accessing host to the free block list. To return the unallocated free blocks, the host inserts new nodes of free block clusters into the free block list and leaves the check out attribute 624, 625, 626, 627 of the newly inserted cluster nodes blank.

In addition to setting the check out attribute, the accessing host also sets a timestamp attribute 628, 629, 630, 631 with a value indicating when the free blocks were checked out. The timestamp 628, 629, 630, 631 is employed to prevent a host from holding unallocated free blocks indefinitely. This situation can occur, for example, when a host has checked out one or more clusters of free blocks and then becomes inoperative, or "crashes," before the host has the opportunity to return the unallocated blocks to the free block list. If the timestamp 628, 629, 630, 631 is older than some predetermined value, other hosts may then claim the unallocated blocks from the outdated cluster of free blocks using the standard check out procedure.

In the specific example of FIG. 11, the first cluster of free blocks denoted by entry 620 is checked out to a host i with a timestamp value 628 of $t_1$, and the second cluster indicated by entry 621 is checked out to a host j with a timestamp value 629 of $t_2$. The other clusters denoted by the entries 622, 623 shown are not checked out, and thus remain available to any host.

The file system stores within its file system descriptor the location of the file descriptor of the root directory. As the root directory and subdirectories accumulate files and other directories, links are provided within each directory pointing to block locations in the file data block area where the files and file descriptors associated with the directory are stored. Therefore, the file system can trace the entirety of the directory structure starting from the root directory. FIG. 12 illustrates how a directory structure is implemented in an exemplary conventional local file system. The file system may follow a link 642 from its file system descriptor 640 to the location of the file descriptor 644 of the root directory, which in turn contains another link 646 indicating the location of additional data 648 associated with the root directory.

In one embodiment of the invention, a separate set of file descriptors for the root directory are provided for each host that shares the device, in contrast to the single set of file descriptors normally employed. FIG. 13 illustrates one possible implementation of multiple file descriptors for the root directory, one for each host that shares a data storage device. In this example, the file system descriptor 650 contains a link 652 to a set of root directory file descriptors 654, 656, 658, each of which is the file descriptor of the root directory for each of three hosts sharing the device.

When a host accesses the file system to view the directory structure, the host peruses the entire directory structure by following the links to the corresponding file descriptors and data starting from the complete set of root directory file descriptors 654, 656, 658 allocated to the hosts. In the particular example of FIG. 13, the links 652 in the file system descriptor 650 point to three root directory file descriptors 654, 656, 658, each of which corresponds to one of the three hosts. Also, each of the root directory file descriptors 654, 656, 658, in turn, points to the corresponding data blocks 660, 662, 664 for storing directory information for each of the three hosts, respectively.

Figures 14A, 14B, 14C:
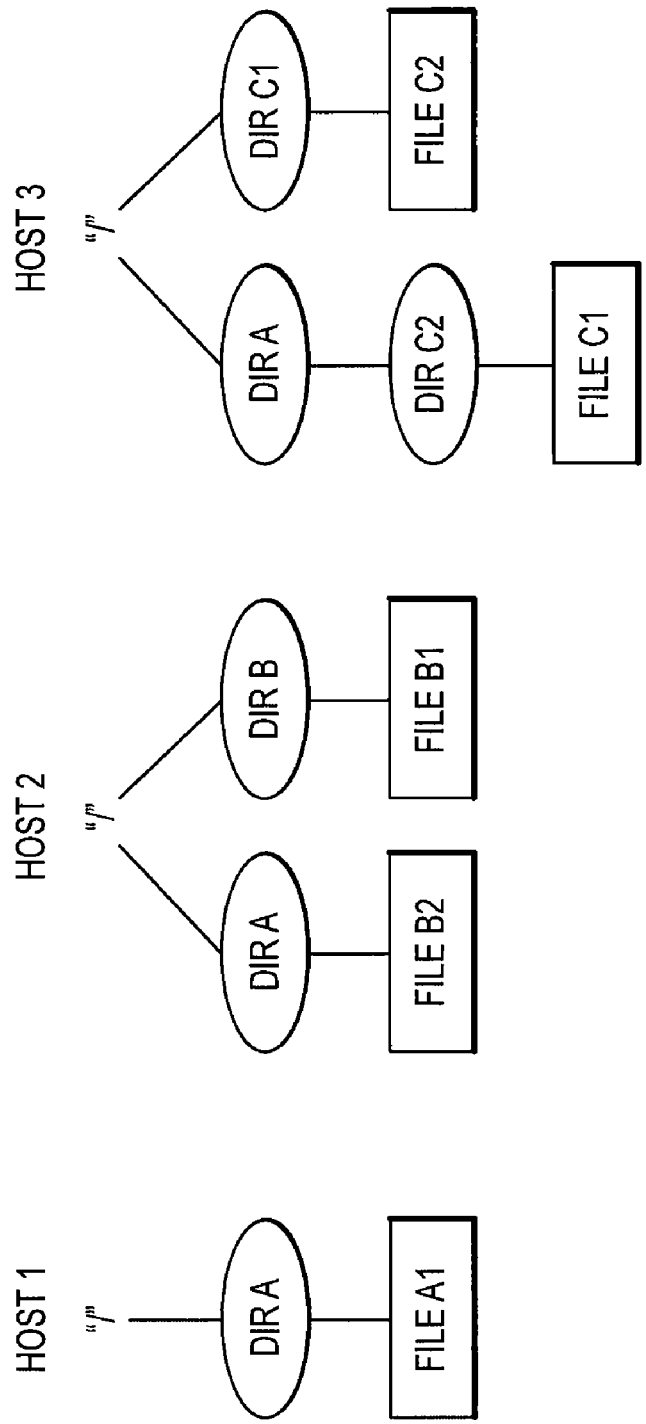
FIG. 14A depicts an example of a first partial directory structure of a file system according to an embodiment of the invention.
FIG. 14B depicts an example of a second partial directory structure of a file system according to an embodiment of the invention.
FIG. 14C depicts an example of a third partial directory structure of a file system according to an embodiment of the invention.

In further reference to the exemplary file directory structure depicted in FIG. 13, presume Host 1 creates a directory "dir A" under the root directory, and creates a file "file A1" under the "dir A" directory, as depicted in FIG. 14A. Host 1 stores information necessary for the directory structure it created in the blocks allocated for its root directory file descriptor 654 and associated data blocks 660, as shown in FIG. 13. Similarly, as shown in FIG. 14B, Host 2 creates its own directory "dir B" under the root directory, and creates a file "file B1" under "dir B," using its root directory file descriptor 656 and data blocks 662. Host 2 then creates another file "file B2" under "dir A" originally created by Host 1, employing information in the root directory file descriptor 654 and data blocks 660 created by Host 1. Further, as shown in FIG. 14C, Host 3 creates its own directories "dir C1" and "dir C2" under the root directory and "dir A" by employing its root directory file descriptor 658 and data blocks 664. Host 3 then creates files, "file C1" and "file C2" under "dir A" and "dir C1", respectively.

As is evident from the foregoing discussion, any host can read directory structures created by other hosts in order to obtain a complete view of the entire directory structure by following the links starting from the root directory file descriptors allocated for the hosts involved. As a result, any host can create its own files under directories created by other hosts.

Further, if the links starting from one of the root directory file descriptors identified with a particular host (for example, the root directory file descriptor for Host 1) are followed, the directory structure created by that host may be retrieved. In other words, each of the directory structures created by each host can be retrieved by following the links starting from the root directory file descriptor allocated for the corresponding host.

Figure 15:
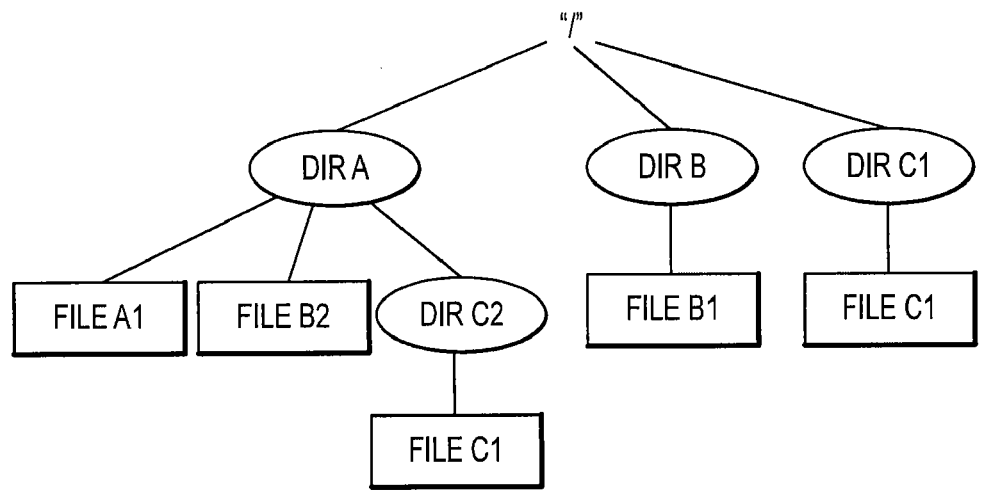
FIG. 15 depicts the entire directory structure of the examples in FIGS. 14A, 14B and 14C.

Based on the foregoing, the directory structure created by each host constitutes a portion of the total directory structure of the entire file system. The total directory structure may thus be obtained by superimposing the partial directory structures created by each of the hosts. For example, FIG. 15 depicts the total directory structure of the data storage device by superimposing the three partial directory structures created by the three hosts, as shown in FIGS. 14A, 14B and 14C.

The file system maintains attributes of a file, as well as the file data itself, to represent related information necessary for management of the file. One such attribute in one embodiment indicates ownership of the file. Because embodiments of the invention allow multiple independent hosts to share the same device directly at the device level, the file system may maintain an "ownership" attribute within the meta-data of each file to distinguish which host maintains ownership of the file. This host identification prevents a host from exercising impertinent access rights to files owned by other hosts.

Another file attribute in another embodiment of the invention is a "check out" attribute of a file, which is distinguished from the "check out" attribute associated with each free block cluster, described in detail above. When a host having write permission for a particular file accesses that file, the file system marks the check out attribute of the file with an identification of the accessing host. At that point, other hosts may not check out the file with write permission. This mechanism prevents more than one host from writing the same file at the same time, which would likely corrupt the data in the file. However, in some embodiments hosts may read a file that is currently checked out by another host holding write permission.

In one embodiment, the file system may require a host to acquire a resource lock before it can check out the file in order to prevent race conditions created by multiple hosts vying to check out the same file. Alternatively, if the data integrity level of a file is relaxed, use of a resource lock can be avoided. For example, some video and audio data files may remain viable even if the data integrity of the files has been compromised to a degree.

Conventional file systems typically maintain in-memory data structures, instead of on-disk data structures (such as the file check out attribute described above), for managing the consistency of files opened by system processes of the host. Storing such data structures in volatile memory, like many forms of random access memory (RAM) (or other non-persistent storage devices), may be appropriate in an environment in which a single host possesses exclusive control of the storage device. In the embodiments described herein, however, multiple hosts may share control of the data storage device. Therefore, data structures relevant to file consistency management that are maintained only within the volatile memories of each host may have limited utility where multiple hosts share the same storage device directly at the device level unless the hosts share the in-memory data structures spread over multiple hosts.

A file system generally maintains files containing information for effective handling of the blocks of the storage device on which the file system is implemented. These files are termed "file system files." Typically, two of these files are the free block file and the bad block file. The free block file contains a list of blocks that are free, and possibly a complementary list of blocks that are written. The bad block file contains a list of "bad," or defective, blocks on which no data can be written to or read from correctly, generally due to defective portions of the recordable medium within the data storage device. Conventional file systems have a single host manage those particular file system files.

In various embodiments of the present invention, each host of a multiple-host system accesses the free block file in a mutually exclusive manner by way of the cluster check out attribute, as described in detail earlier. In addition, resource lock acquisition may be required prior to setting the check out attribute in some embodiments, thereby providing additional data integrity for the free block file. Access to the bad block file may be regulated in a similar fashion so that hosts may add bad blocks to the bad block list in a secure manner as they are encountered in the course of disk operation. Further, the same control mechanism may be applied to maintain the data integrity of any file system files.

Ordinarily, the use of multiple hosts sharing a single data storage device would produce the possibility of file name conflicts among files created by the multiple hosts. For example, if the hosts run the same operating system and use default swap files set automatically by the operating system, two or more swap files associated with different hosts could have the same file name under the same directory. However, in embodiments of the invention, the host ownership attribute (described above) may be utilized to distinguish such files.

Figure 16:
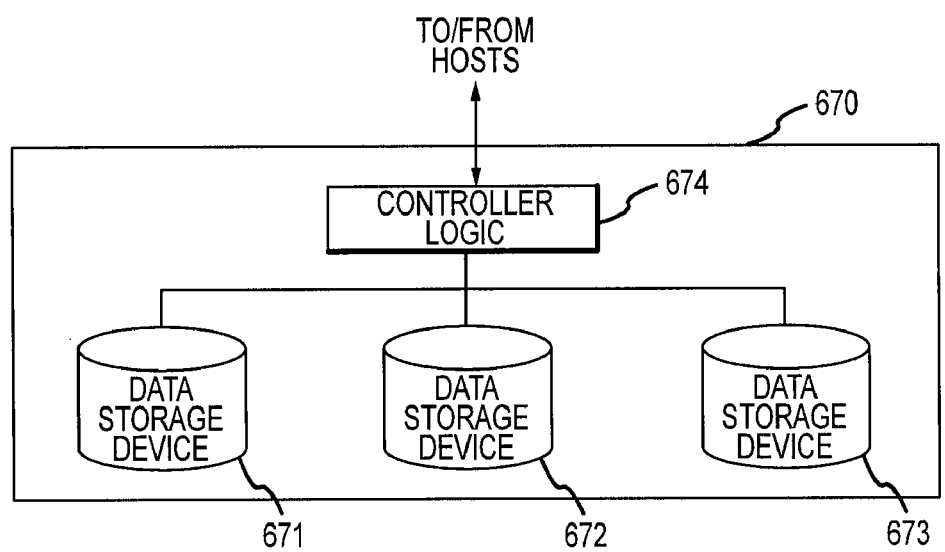
FIG. 16 depicts a system employing multiple data storage devices using a file system according to an embodiment of the invention.

The file system features presented herein may also be implemented in a system employing multiple shared storage devices. FIG. 16 presents a data storage system 670 containing multiple data storage devices 671, 672, 673 (such as hard disk drives) with controller logic 674. The controller logic 674 oversees all three data storage devices 671, 672, 673 and collectively treats the devices 671, 672, 673 as an array of disk blocks of a larger data storage device, thus providing a view of a single data storage device to the hosts that share the system 670. Alternatively, multiple data storage device partitions of one or more physical storage devices may be presented in a similar manner.

The controller logic 674 may be implemented as hardware, software, or some combination thereof. In one embodiment, a combination of hardware and software could be employed to process device-level commands for each of the data storage devices 671, 672, 673, such as the device-level controller discussed earlier. (For example, the aforementioned device-level controller may implement, or serve as an example of, the controller logic 674.) Alternatively, the controller logic 674 may be a software driver executed by a microcontroller system capable of transforming and/or relaying device-level commands received from a host to one of the data storage devices 671, 672, 673. In that case, the driver may determine which of the three storage devices 671, 672, 673 is the target of the command received and performs any block location translation necessary from the addressing scheme utilized by the host to the scheme employed by the particular storage device 671, 672, 673. The driver would then relay the modified command to the appropriate target storage device 671, 672, 673, which is capable of processing the modified command itself.

In alternative embodiments of the invention, data integrity of a system of multiple hosts sharing a data storage device can be maintained by utilizing file systems already existing in current hosts. More specifically, instead of allowing all hosts to share a data storage device directly at the device level over a network, one host may have access to the data storage device at device level over a network, while all other hosts are allowed indirect access to the data storage device via their network file systems.

Figure 17:
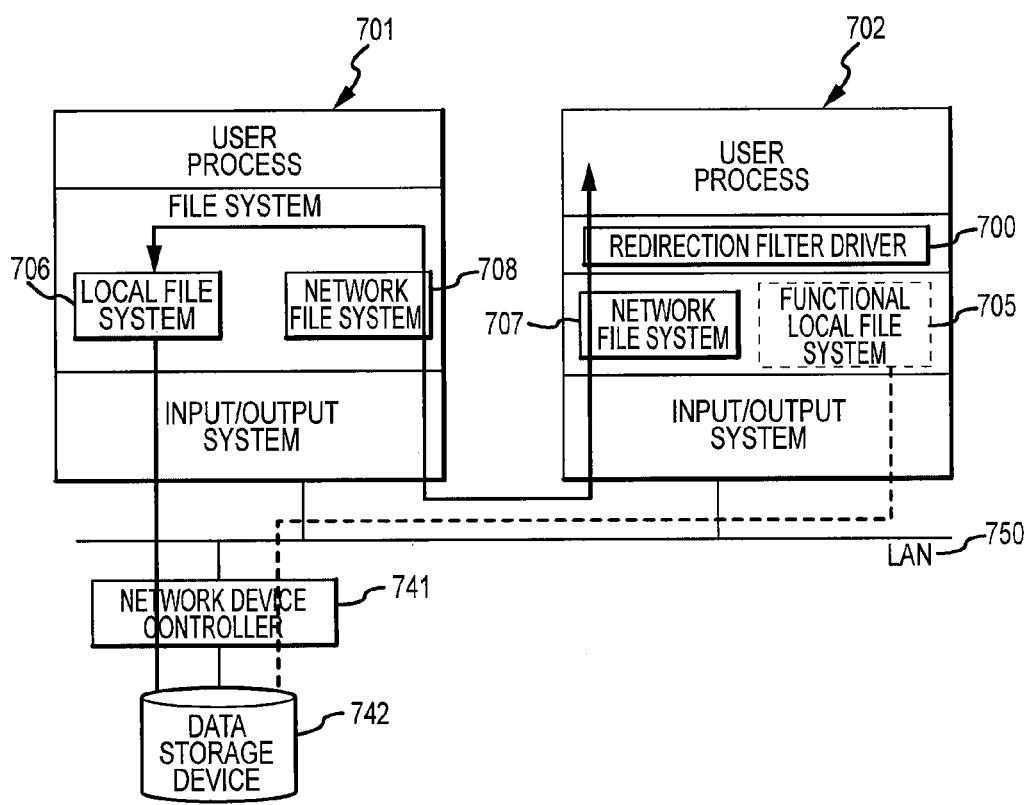
FIG. 17 depicts a block diagram of a networked system according to an embodiment of the invention maintaining the data integrity of a data storage device shared by multiple hosts by way of network file systems.

FIG. 17 shows an alternative embodiment where only a first host 701 is allowed to mount a networked data storage device 742 (such as a hard disk drive) by way of a network device controller 741 with full read/write privileges onto one of its local file systems 706. All other hosts requiring access to the data storage device 742, such as a second host 702, are not permitted to mount the networked data storage device 742 onto their own local file systems.

In one embodiment using the structure described in FIG. 17, a redirection filter driver 700, a software component, resides at the interface between the user process and the file system of the second host 702. Although the second host 702 has no privilege of directly mounting the data storage device 742, the redirection filter driver 700 redirects all file access requests from a user process intended for the data storage device 742 toward a network file system 707 of the second host 702. As a result, the redirection filter driver 700 presents the appearance of a local file system (shown as a functional local file system 705 in FIG. 17) to the user process as if the data storage device 742 were mounted onto the second host 702. The network file system 707 of the second host 702 is connected by way of the LAN 750 with a network file system 708 of the first host 701 so that the file access requests directed toward the data storage device 742 generated in the second host 702 are routed to a local file system 706 of the first host 701, onto which the data storage device 742 is actually mounted.

Sharing the data storage device 742 between the first and second hosts 701, 702 in this manner provides advantages over a system which employs indirect sharing of a data storage device strictly at the network file system level, as described earlier. Although the embodiment of FIG. 17 exploits features of the network file systems 707, 708 in order to transmit file access requests and replies between the second host 702 and the data storage device 742 while maintaining data integrity, an additional network file system for the data storage device 742 is not required. Instead, the embodiment of FIG. 17 provides hosts a functional view of a local file system onto which the data storage device 742 appears to be directly mounted. As used herein, the term "functional" refers to a duplication of the view that would be shown if the file were accessible on a local storage device, rather than across a network. The data storage device 742 and its files are handled in exactly the same fashion as actual local data storage devices and files. Due to the operation of the redirection filter driver 700, the hosts exhibiting a functional local file system view cannot distinguish the data storage device 742 shared over the network from the devices actually mounted on their own conventional local file systems. Accordingly, since the files on the data storage device 742 are not viewed as shared through conventional network file systems, but are instead viewed as stored by way of a local file system, file usage limits that would otherwise exist if the files were shared through conventional network file systems are eliminated.

Similarly, when the network file system 708 of the first host 701 later receives a reply from the local file system 706 to be transferred to the network file system 707 of the second host 702, the network file system 707 of the second host 702 directs the reply to the requesting user process through the redirection filter driver software 700 as though the reply were received from the functional local file system 705.

If no network file system is available or desirable between a host that physically mounts a data storage device (e.g., the first host 701 of FIG. 17) and other hosts that do not have direct access to the data storage device (e.g., the second host 702 of FIG. 17), a network connection program may be utilized instead of a network file system to transfer requests and replies for file accesses involving a data storage device.

Figure 18:
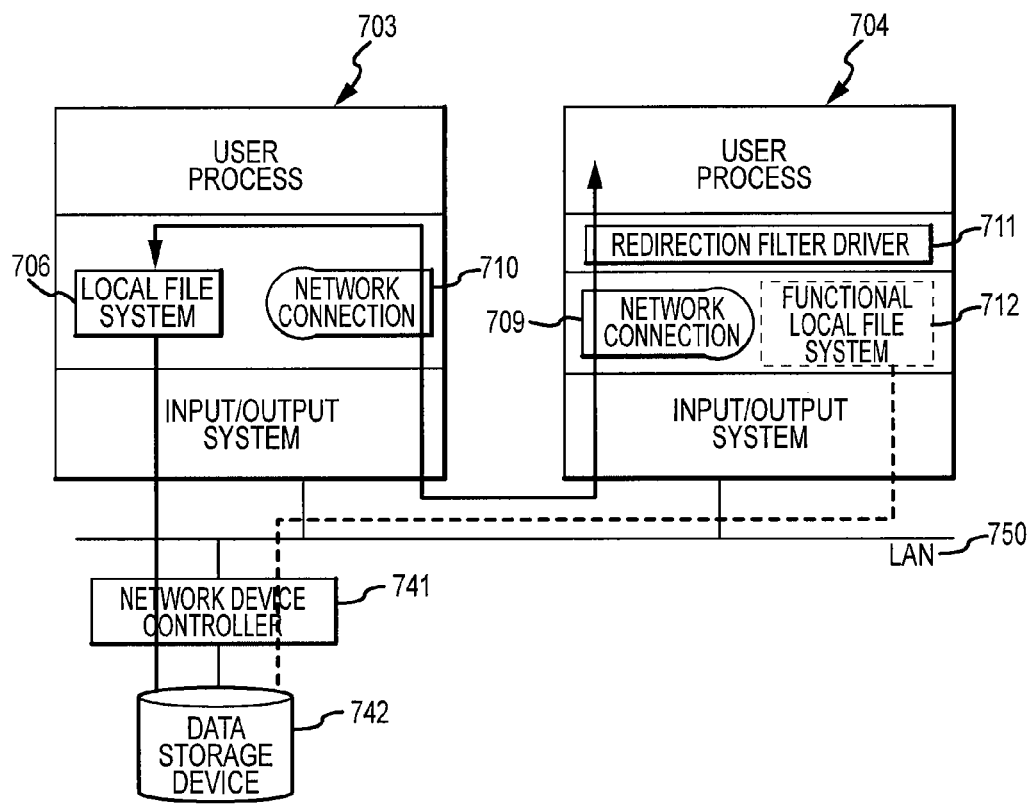
FIG. 18 depicts a block diagram of a networked system according to an embodiment of the invention maintaining the data integrity of a data storage device shared by multiple hosts by way of network connection programs.

FIG. 18 illustrates an alternative embodiment wherein only a first host 703 possesses direct access to a data storage device 742, such as a hard disk drive, while other hosts, such as a second host 704, may only access the data storage device 742 via the first host 703. Each of the first and second hosts 703, 704 employ a network connection program 710, 709 for communication between the hosts 703, 704, respectively. No network file systems are required. Similar to the system of FIG. 17, a redirection filter driver 711, residing between a user process and the file system of the second host 704, intercepts data storage device access requests from the user process and redirects the requests to the network connection 709 of the second host 704. This network connection 709 then relays these requests to its counterpart network connection 710 of the first host 703, which in turn directs the request to a local file system 706 of the first host 703, onto which the networked data storage device 742 is mounted through a network device controller 741. As was the case with the embodiment outlined in FIG. 17, the redirection filter driver 711 operates to present a functional local file system 712 to a user process of the second host 704, making the fact that the data storage device 742 is not mounted locally to the second host 704 transparent to the user process.

When the network connection 710 of the first host 703 then receives a reply from the local file system 706 to be transferred to its counterpart network connection 709 of the second host 704, the network connection 709 of the second host 704 directs the reply to the requesting user process through the redirection filter driver software 711 as if the reply were received from the functional local file system 712. The network connections 709, 710 can be any program that transfers requests and replies therebetween, such as a conventional socket program.

Certain features of the invention described herein may be implemented as an additional layer in or atop the file and/or operating systems. For example, the aforementioned filter driver software may be added to an existing file system without requiring modification of the file system. Similarly, certain features of the invention may be implemented as an additional attribute of a storage device, storage device controller, or storage device file system/structure. For example, the aforementioned check out attribute may augment a file system or structure to provide added functionality. The basic file system/structure may remain relatively unchanged. In other words, the basic functionality and features of the core file system, structure, operating system, and so forth remain unchanged by the invention, which provides added functionality.

Disclosed herein are several embodiments of systems and methods for ensuring the data integrity of a networked data storage device that is shared among a plurality of hosts. While these embodiments are described in specific terms, other embodiments encompassing principles of the invention are also possible. For example, various features of one embodiment may be combined with features of other embodiments to create a new embodiment not specifically discussed herein. Thus, the scope of the invention is not to be limited to the disclosed embodiments, but is determined by the following claims.

What is claimed is:

1. A networked system for providing access to user data while preserving the data integrity of the user data, comprising:

a data storage device comprising the user data;

a plurality of hosts coupled at a device level to the data storage device by way of a digital network; and a resource lock providing exclusive access to the data storage device to one of the plurality of hosts at a time;

wherein commands to the data storage device originating from any one of the plurality of hosts are directed to a first host, the first host redirecting all such commands to the data storage device.

2. The networked system of claim 1, wherein the resource lock is acquired and released by way of software commands issued over the network by the hosts to the data storage device.

3. The networked system of claim 1, wherein the resource lock is implemented entirely in software.

4. The networked system of claim 1, wherein the resource lock is released after being held for a predetermined period of time.

5. The networked system of claim 1, the data storage device comprising a hard disk drive.

6. The networked system of claim 1, the data storage device comprising a writable compact disc drive.

7. The networked system of claim 1, the data storage device comprising a writable digital versatile disc drive.

8. The networked system of claim 1, the data storage device comprising a magnetic tape drive.

9. The networked system of claim 1, wherein at least one of the plurality of hosts comprises a personal computer.

10. The networked system of claim 1, wherein at least one of the plurality of hosts comprises a workstation.

11. The networked system of claim 1, wherein at least one of the plurality of hosts comprises a personal digital assistant.

12. The networked system of claim 1, wherein the digital network is a local area network.

13. The networked system of claim 1, wherein the digital network is a wide area network.

14. The networked system of claim 1, wherein the digital network is the Internet.

15. A networked system for providing access to user data while preserving the data integrity of the user data, comprising:
   a data storage device comprising the user data;
   a plurality of hosts coupled at a device level to the data storage device by way of a digital network;
   a resource lock resident on the storage device and providing exclusive access to the data storage device to one of the plurality of hosts at a time; and
   filter driver software in each of the plurality of hosts, the filter driver software configured to intercept read and write requests generated within each of the plurality of hosts intended for the data storage device and forward such requests to a single unique host of the plurality of hosts.

16. A networked system for providing access to user data while preserving the data integrity of the user data, comprising:
   a data storage device comprising the user data;
   a first host having exclusive direct access to the data storage device by way of a digital network, the first host comprising a local file system coupled with the data storage device; and
   a second host coupled to the first host by way of the digital network, the second host comprising a redirection filter driver configured to direct a file access request generated by the second host to the data storage device by way of the local file system of the second host instead of a local file system of the first host.

17. The networked system of claim 16, wherein:
   the first host further comprises a first network file system coupled with the digital network and the local file system of the first host; and
   the second host further comprises a second network file system coupled with the digital network and the redirection filter driver of the first host;
   the second network file system is configured to receive the file access request from the redirection filter and send the file access request to the first network file system; and
   the first network file system is configured to forward the file access request to the data storage device by way of the local file system of the first host.

18. The networked system of claim 16, wherein:
   the first host further comprises a first network connection coupled with the digital network and the local file system of the first host; and
   the second host further comprises a second network connection coupled with the digital network and the redirection filter driver of the first host;
   the second network connection is configured to receive the file access request from
   the redirection filter and send the file access request to the first network connection; and
   the first network connection is configured to forward the file access request to the data storage device by way of the local file system of the first host.

19. The networked system of claim 18, the network connection comprising a socket connection program.

20. The networked system of claim 16, the data storage device comprising a hard disk drive.

21. The networked system of claim 16, the data storage device comprising a writable compact disc (CD) drive.

22. The networked system of claim 16, the data storage device comprising a writable digital versatile disc (DVD) drive.

23. The networked system of claim 16, the data storage device comprising a magnetic tape drive.

24. The networked system of claim 16, wherein at least one of the first and second hosts comprises a personal computer.

25. The networked system of claim 16, wherein at least one of the first and second hosts comprises a workstation.

26. The networked system of claim 16, wherein at least one of the first and second hosts comprises a personal digital assistant (PDA).

27. The networked system of claim 16, the digital network comprising a local area network (LAN).

28. The networked system of claim 16, the digital network comprising a wide area network (WAN).

29. The networked system of claim 16, the digital network comprising the Internet.

* * * * *